United States Patent [19]

Midy

[11] 3,929,148

[45] Dec. 30, 1975

[54] DIFFERENTIAL AND PROPORTIONAL PNEUMATIC AMPLIFIERS

[75] Inventor: Michel Midy, Pavillon-sous-Bois, France

[73] Assignee: Materiel Electrique de Controle et Industriel, Paris, France

[22] Filed: Nov. 4, 1974

[21] Appl. No.: 520,781

Related U.S. Application Data

[63] Continuation of Ser. No. 331,952, Feb. 12, 1973, abandoned.

[30] Foreign Application Priority Data

Feb. 14, 1972 France............................ 72.04825

[52] U.S. Cl..................................... 137/84; 137/82
[51] Int. Cl.²......................................... G05D 16/06
[58] Field of Search ................ 137/82, 84; 251/61.1

[56] References Cited
UNITED STATES PATENTS

| | | | |
|---|---|---|---|
| 2,638,911 | 5/1953 | Griswold et al........................ | 137/84 |
| 3,287,970 | 11/1966 | Harris................................ | 137/85 X |
| 3,490,479 | 1/1970 | Mott et al....................... | 251/61.1 X |
| 3,681,546 | 8/1972 | Coin et al. ........................ | 137/82 X |
| 3,692,240 | 9/1972 | Spethmann........................ | 137/85 X |
| 3,717,162 | 2/1973 | Prescott............................. | 137/84 X |

FOREIGN PATENTS OR APPLICATIONS

| | | | |
|---|---|---|---|
| 249,063 | 1/1970 | U.S.S.R............................ | 251/61.1 |

Primary Examiner—Alan Cohan
Assistant Examiner—Gerald A. Michalsky
Attorney, Agent, or Firm—Christie, Parker & Hale

[57] ABSTRACT

A differential and proportional pneumatic amplifier in which the input stage comprises a first chamber divided by a first membrane into a first compartment which is provided with a first pressure input and into a second compartment which is provided with a second pressure input. The first input directly receives a pressure $P_1$ and the second input receives a pressure $P_2$ via a pneumatic resistance. The second compartment has a first outlet aperture which may be closed by the first membrane under the influence of the pressure $P_1$, said aperture providing a flow Q proportional to the pressure difference $P_2 - P_1$. A second stage of the amplifier comprises a second chamber divided by a second membrane into third and fourth compartments. The third compartment receives flow Q through a third input connected to the first aperture and has an output channel connected to the atmosphere provided with a pneumatic resistance such that the pressure P prevailing in the third compartment is proportional to flow Q and thus to the difference of the pressures $P_2 - P_1$. The fourth compartment, in which atmospheric pressure prevails, has a second outlet aperture forming the nozzle of a nozzle-palette device which is closed to a greater or lesser degree by the second membrane which acts as a baffle under the influence of the pressure P such that the output pressure $P_s$ of said nozzle-baffle device is proportional to the pressure P.

12 Claims, 6 Drawing Figures

DIFFERENTIAL AND PROPORTIONAL PNEUMATIC AMPLIFIERS

This is a continuation of application Ser. No. 331,952, filed Feb. 12, 1973, now abandoned.

The present invention relates to a differential and proportional pneumatic amplifier intended particularly for effecting industrial automation.

Although fluidic amplifiers have well-known advantages over customary amplifiers having membranes or bellows, they nevertheless have various drawbacks which until now have prevented their development within the field of industrial control, particularly for the following reasons:

their output level is too low unless one consents to considerably increasing their air consumption (several cubic meters per hour, measured at normal conditions of pressure and temperature, for an output level of one bar). In order to be convenient to use, this output level must be at least one bar;

their input resistances are always very low which complicates the production of wiring diagrams. The connection of several amplifiers or more particularly the connection of amplifiers to members of the resistance/capacitance type producing transfer functions of the first degree having a high time constant is very delicate;

the gain in pressure of basic fluidic amplifiers is too low so that it is almost always necessary to connect several of them in order to obtain gains of the order of one thousand.

It is the object of the present invention to provide an amplifier having the advantages of fluidic amplifiers without being effected by their drawbacks.

In one of its aspects the invention relates particularly to a pneumatic amplifier devoid of levers, pivot points and large moving parts.

Another object of the invention is to provide an amplifier operating with small flexible membranes which may weigh for example less than 5 centigrammes.

The amplifier to which the invention is applied comprises two stages, namely:

a first stage which converts the difference of two input pressures $P_2$, $P_1$ into a proportional flow Q;

a second stage which transforms the flow Q into a pressure which is then amplified.

In a preferred embodiment, the amplifier comprises an additional stage of the same structure as the first stage in order that the resistances of the two pressure inputs are infinite.

Amplifiers are known comprising at the input a chamber divided by a first membrane into a first compartment which is provided with a pressure input and a second compartment which is also provided with a pressure input, one of the pressure inputs directly receiving a pressure $P_1$.

Amplifiers are also known comprising at the outupt a nozzle-palette device intended to amplify the output pressure.

With respect to these known devices, there is provided according to the invention, a differential and proportional amplifier comprising at the input a chamber divided by a first membrane into a first compartment which is provided with a pressure input and into a second compartment which is also provided with a pressure input, one of the pressure inputs directly receiving a pressure $P_1$ and comprising a nozzle-baffle output device, wherein the other of the pressure inputs receives a pressure $P_2$ by the intermediary of a pneumatic resistance;

the compartment connected to the pressure source $P_2$ is provided with an outlet aperture which may be closed by the membrane under the influence of the pressure $P_1$, said aperture providing a flow Q proportional to the difference of the pressures $P_2 - P_1$ and the amplifier comprises a second chamber divided by a second membrane into a third compartment which receives said flow through an input connected to said aperture and which is provided with an output channel connected to the atmosphere provided with a pneumatic resistance such that in the third compartment there prevails a pressure P proportional to the flow Q and thus to the difference of the pressures $P_2 - P_1$ and into a fourth compartment of the type known per se and in which atmospheric pressure prevails and which comprises an exhaust aperture forming the nozzle of a nozzle-baffle device and which is closed to a greater or lesser degree by the membrane which acts as a palette under the influence of the pressure P such that the output pressure $P_s$ of the nozzle-baffle device is proportional to the pressure P.

The above-mentioned variation is characterised by the fact that the amplifier comprises a copying chamber of structure similar to the first chamber but which receives the pressure $P_2$ in place of the pressure $P_1$, the supply pressure $P_a$ in place of the pressure $P_2$, and the output aperture of which is an exhaust aperture connected to the atmosphere, the compartment which comprises said exhaust aperture also comprising an output channel providing the pressure $P_2$.

According to a feature of the invention, the use of membranes composed of a quite rigid material (modulus of elasticity of the order of $3 \times 10^4$ bar/cm$^2$) makes it possible to perforate the pneumatic resistances necessary for operation in the part of the membranes which is gripped. This arrangement considerably reduces the bulk of the apparatus and decreases the number of parts as well as the number of machinings.

One embodiment of an amplifier according to the present invention will be described hereafter as an example with reference to the figures of the accompanying drawing in which:

FIGS. 1 and 2 illustrate respectively the input stage and the second stage of the amplifier.

Figure 1:
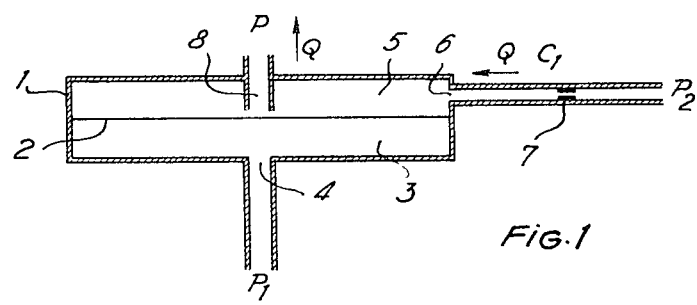
FIG. 1 is a circuit diagram of the first stage of the amplifier.

The input stage of the amplifier comprises a chamber 1 (FIG. 1) divided by a first membrane 2 into a first compartment 3 which is provided with a pressure input 4 and into a second compartment 5 which is also provided with a pressure input 6. One of the pressure inputs 4 directly receives a pressure $P_1$ and the other pressure input 6 receives a pressure $P_2$ by means of a pneumatic resistance 7. The compartment 5 connected to the source of pressure $P_2$ is provided with an outlet aperture 8 which may be closed by the membrane 2 under the influence of the pressure $P_1$, said aperture providing a flow Q proportional to the difference of the pressures $P_2 - P_1$.

Figure 2:
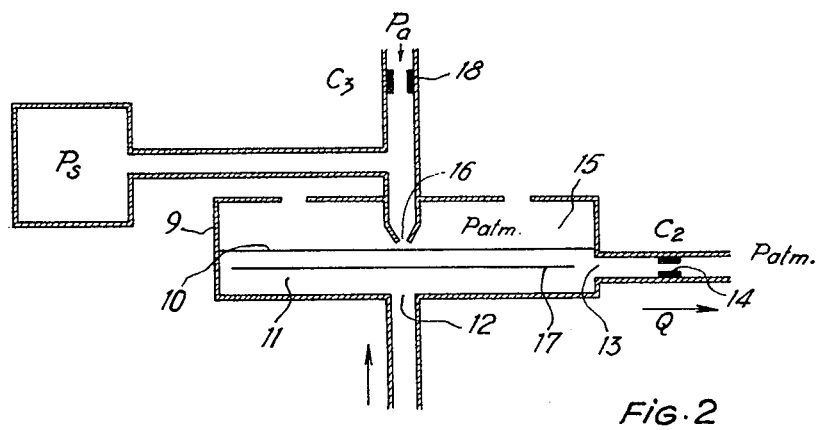
FIG. 2 is a circuit diagram of the second stage of the amplifier.

The second stage of the amplifier comprises a chamber 9 (FIG. 2) divided by a membrane 10 into one compartment 11 which receives said flow Q through an input 12 connected to said aperture 8 and which comprises an output channel 13 connected to the atmosphere provided with a pneumatic resistance 14 such that the pressure P prevailing in the compartment 11 is proportional to said flow Q and thus to the difference of the pressures $P_2 - P_1$ and into a compartment 15 in which atmospheric pressure prevails and which comprises an outlet aperture 16 forming the nozzle of a nozzle-baffle device and which is closed to a greater or lesser degree by the membrane which acts as a baffle under the influence of the pressure P such that the output pressure $P_s$ of said nozzle-baffle device is proportional to the pressure P.

Preferably, the compartment 11 contains a floating membrane 17 which prevents the second membrane from being set in vibration and consequently prevents the production of disagreeable sound of which these vibrations are the cause.

The operation of this amplifier may be explained as follows:

In the first stage, the conversion of the difference of the two input pressures $P_2 - P_1$ into a proportional flow Q is effected, this stage being designed as a pressure copier.

The pressure $P_1$ controlling the decrease in the output pressure being applied to one side of the flexible membrane 2, tends to close the outlet aperture 8 and thus to decrease the mass flow Q through the resistance 7.

Thus, providing that the surface of the membrane is much greater than that of the aperture 8 and if the pressure P which prevails downstream is less than $P_2$, the pressure which exists downstream of the resistance 7 and which is applied to the other side of the membrane 2 is equal to $P_1$.

To simplify the explanation it will be assumed that the mass flow through the pneumatic resistances is proportional to the difference of the upstream and downstream pressures and that the coefficient of proportionality is constant. This coefficient is the conductance of the resistance.

Under these conditions, if the conductance of the resistance 7 is $C_1$, we have the relationship:
$$Q = C_1 (P_2 - P_1) \qquad (a)$$

The second stage converts the flow Q into a proportional pressure which is then amplified.

The flow Q passes through the pneumatic resistance 14 of conductance $C_2$. At the two ends of this resistance prevail firstly the pressure P and secondly atmospheric pressure. If the pressures are relative pressures, these values are interrelated by the relationship:
$$Q = C_2 P \qquad (b)$$

The pressure P, which is applied to the flexible membrane 10 identical to the membrane 2 tends to close the nozzle 16 of the amplifier of the nozzle-baffle type which comprises the resistance 18 supplied by the supply pressure $P_a$ (the value of which is for example 1.4 bars for an output level of one bar).

If S is the useful surface of the flexible membrane 10 and s that of the nozzle there exists at equilibrium and at a first approximation a relationship between the pressure P and the output pressure $P_s$:
$$P_s \times s = P \times S \qquad (c)$$

By combining the relationships (a), (b) and (c) we have:

$$P_s = \frac{SC_1}{sC_2}(P_2 - P_1) = G (P_2 - P_1) \qquad (d)$$

It can be seen that the gain G of the differential amplifier is proportional to the conductance $C_1$: it may thus be as large as desired.

The conductance $C_2$ is chosen such that in the state of equilibrium the flow Q is very small (several Nl/h) i.e., liters per hour measured at normal conditions of pressure and temperature thus the + input resistance defined as the reverse of a conductance $C_+$ is very large $$\frac{1}{C_+} = \frac{P_2}{Q}$$

Under these conditions the pressure P is always very low (of the order of 6 m bars for an output level of one bar).

It will be noted that the —input resistance is infinite.

The air consumption of the amplifier of the second stage is equal to:
$$Q = C_3 (P_a - P_s)$$
it is easily made less than 40 Nl/h.

Figure 3:
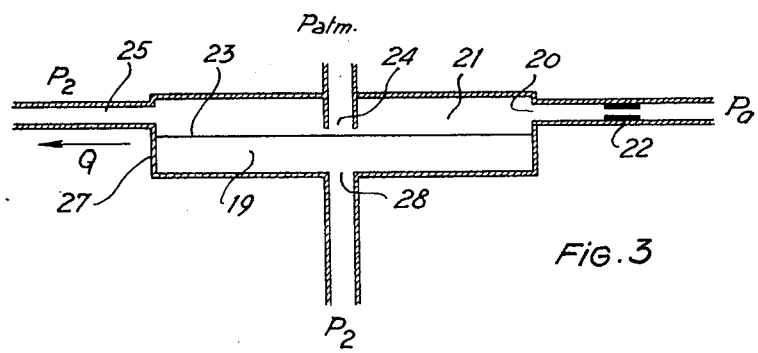
FIG. 3 is a circuit diagram of the optional auxiliary stage of the amplifier.

If for certain embodiments it is found to be an advantage that the resistance of the input 6 is also infinite, this may be obtained by adding a new copying stage identical to the first (FIG. 3).

This copying chamber 27 having a membrane 23 (FIG. 3) receives the pressure $P_2$ at the input 28 of its first compartment 19 whereas the input 20 of its second compartment 21 receives the supply pressure $P_a$ through the intermediary of a pneumatic resistance 22. The output aperture 24 of the compartment 21 is an exhaust aperture connected to the atmosphere, and this compartment also comprises an output channel 25 supplying the pressure $P_2$.

The pressure $P_a$ is applied to the resistance 22 and the pressure $P_2$ is exerted on the membrane 23 which tends to close the aperture 24 downstream of which prevails the atmospheric pressure $P_{atm}$.

In a state of equilibrium, the membrane 23 receives the pressure $P_2$ at each of its sides; this pressure is then applied to the corresponding input of the first stage of the amplifier.

The slight flow Q necessary for operation is thus provided by the small power amplifier which is the copying stage.

There will now be described with reference to FIGS. 4 and 5, a practical embodiment of an amplifier according to the present invention.

Membranes of Mylar (polyester) or of Kapton (polyimide) are used whose modulus of elasticity is greater than that of elastomers which normally serve for the production of membranes for pneumatic apparatuses (of the order of $3 \; 10^4$ bar/cm$^2$).

The membranes are cut from thin sheets (0.05 mm in this embodiment).

The materials used are sufficiently flexible in order that the free part of the membranes may be small (13 mm in this embodiment), they are however rigid enough to facilitate the construction of pneumatic resistances by punching apertures of several tenths of a millimeter diameter in the part of the membrane which is gripped.

The membranes are held between discs which are shaped in order to constitute compartments.

Figure 4:
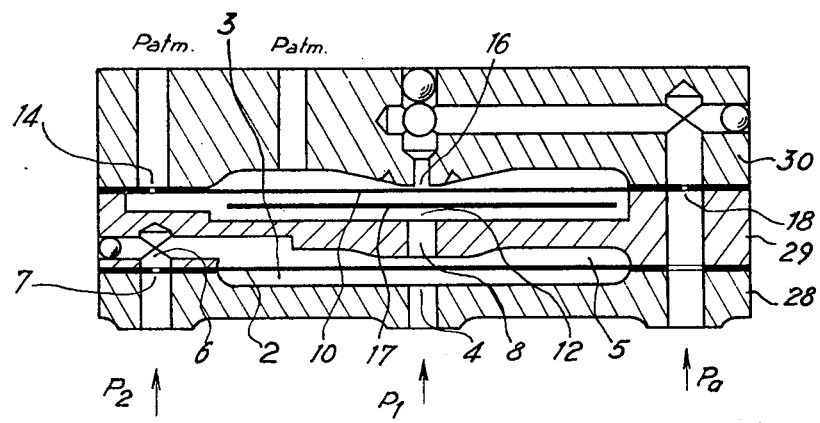
FIG. 4 is a section of one embodiment of the amplifier showing the first and second stage of the amplifier.
Figure 5:
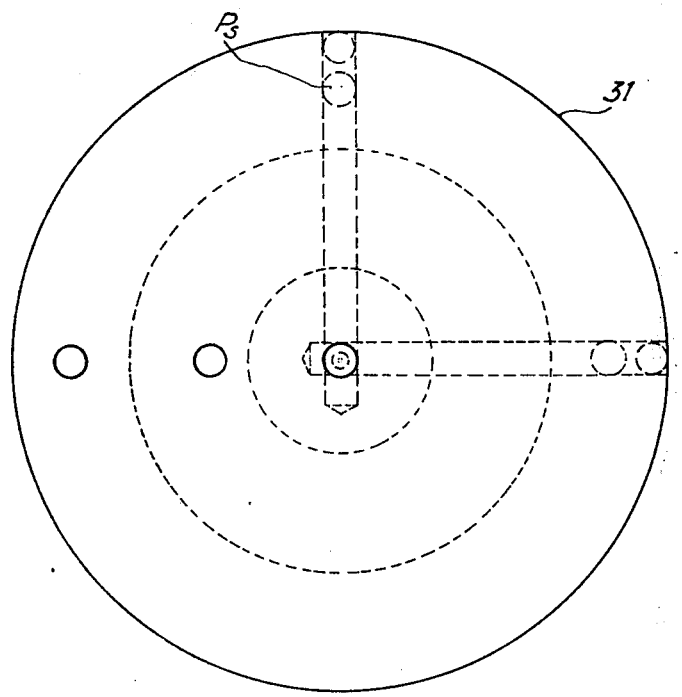
FIG. 5 is a plan view of the embodiment of FIG. 4.

FIG. 4 shows three discs 28, 29, 30 co-operating in pairs to constitute the chambers 1 and 9 with membranes 2 and 10 held respectively between the discs 28, 29 and between the discs 29, 30.

The membrane 2 comprises a perforation 7 constituting the penumatic resistance 7 and the membrane 10 comprises a perforation 14 constituting the penumatic resistance 14.

The arrangement which is very compact is in the form of a cylinder 31 having a diameter of 22 mm and a height of 10 mm.

The pressures $P_1$, $P_2$, $P_a$ and $P_s$ are applied to apertures located at the base of the cylinder. These parts are kept in contact by screws or adhesion.

The good mechanical resistance of the materials constituting the membranes has the effect that the latter may support excess pressures of several bars even at high temperature for Kapton (300°C) without damage.

The parts which are in contact with the membranes at the time of these excess pressures do not comprise acute angles which may deform them permanently as shown in FIG. 4.

As can be seen, this amplifier having free membranes requires no adjustment.

The very high gain of this amplifier makes it possible to use it as a logic member.

Figure 6:
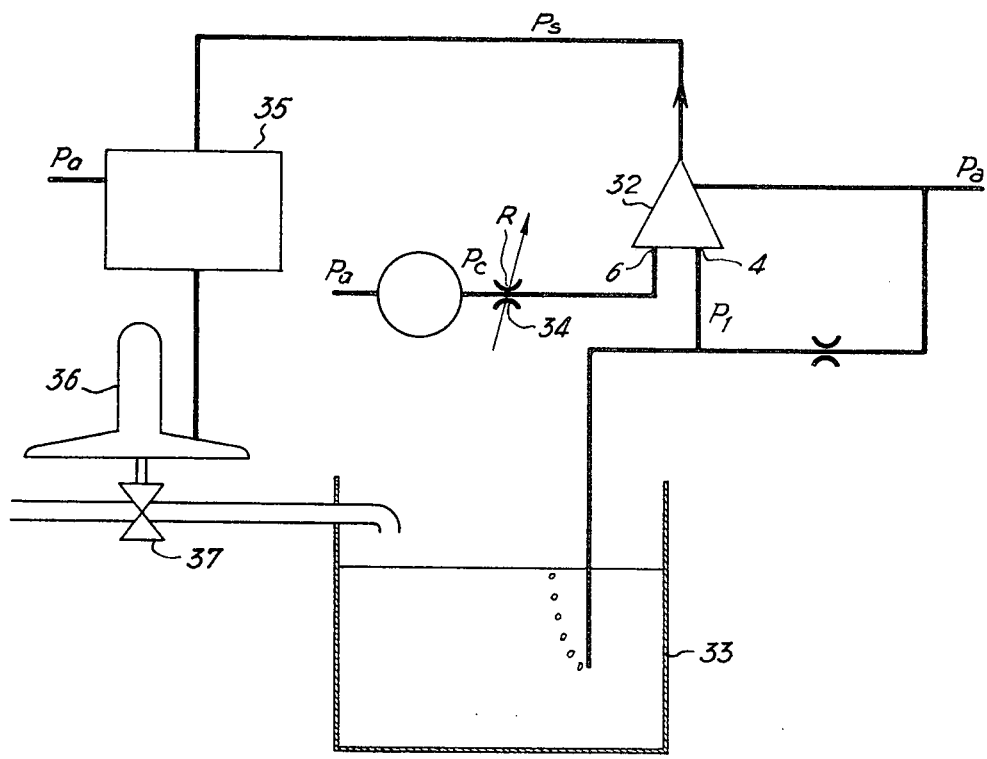
FIG. 6 is a circuit diagram of the application of an amplifier according to the invention to the control of a liquid level in an open tank.

FIG. 6 shows an example of the use of the differential amplifier for controlling the level of the liquid in an open tank 33.

The measurement of the level is obtained by a customary so-called "bubble for bubble" arrangement. The pressure $P_1$ which is the image of the liquid level is applied to the input 4 of the amplifier 32. Located at the input 6 is an adjustable resistance 34 supplied by a reference pressure $P_c$ which is the image of the level which is desired to keep constant. The variable resistance 34 serves to modify the sensitivity of the regulator.

The output pressure $P_s$ controls a power amplifier (booster) 35 which actuates a servo-motor 36 opening or closing a valve 37 in proportion to $P_s$.

What is claimed is:

1. A differential and proportional amplifier comprising:

a first stage chamber divided by a first membrane into a first compartment and a second compartment, the first compartment having a pressure input and the second compartment having a pressure input, the pressure input of the first compartment being directly connected to a pressure source providing a pressure $P_1$, the pressure input of the second compartment being connected by a pneumatic resistance to a pressure source providing a pressure $P_2$, the second compartment having an outlet opening which is closable by the first membrane under the influence of the pressure $P_1$, the outlet opening of the second compartment providing a flow Q proportional to the pressure difference $P_2 - P_1$, and a second stage chamber divided by a second membrane into a third compartment and a fourth compartment, the third compartment having an input connected only to the outlet opening of the second compartment for receiving the flow Q, the third compartment also having a separate output channel connected only to the atmosphere through a pneumatic resistance, such that in the third compartment there prevails a pressure P proportional to the flow Q and thus to the pressure difference $P_2 - P_1$, the fourth compartment being at atmospheric pressure and including an exhaust opening, the exhaust opening forming a nozzle which is closable by the second membrane to thereby act as a baffle under the influence of the pressure P and provide an output pressure $P_s$ from the fourth compartment which is proportional to the pressure P and consequently to the pressure difference $P_2 - P_1$.

2. Apparatus according to claim 1 including a copying chamber divided by a third membrane into a fifth compartment and a sixth compartment, the fifth compartment having a pressure input directly connected to the pressure source $P_2$, the sixth compartment having an exhaust opening connected to the atmosphere and also having an output channel providing the pressure $P_2$ which is connected to the pressure input of the second compartment.

3. Apparatus according to claim 2 in which the pneumatic resistances are provided by apertures formed in the membranes.

4. Apparatus according to claim 3 in which the pneumatic resistance of the first chamber comprises an aperture formed in the membrane of the first chamber and located outside the compartments of the first chamber.

5. Apparatus according to claim 4 in which the nozzle-baffle device includes a pressure input located remote from the nozzle and connected by a pneumatic resistance to a pressure source providing a pressure $P_a$, the pressure input of the sixth compartment being connected by a pneumatic resistance to the pressure source $P_a$, and in which the pneumatic resistance of the second chamber and the pneumatic resistance of the nozzle-baffle device comprise corresponding apertures formed in the membrane of the second chamber.

6. Apparatus according to claim 5 comprising a stack of disks in which are formed said compartments and the input and output passages therefor, said membranes being gripped between the disks.

7. Apparatus according to claim 4 comprising a stack of disks in which are formed said compartments and the input and output passages therefor, said membranes being gripped between the disks.

8. Apparatus according to claim 3 in which the nozzle-baffle device includes a pressure input located remote from the nozzle and connected by a pneumatic resistance to a pressure source providing a pressure $P_a$, the pressure input of the sixth compartment being connected by a pneumatic resistance to the pressure source $P_a$, and in which the pneumatic resistance of the second chamber and the pneumatic resistance of the nozzle-baffle device comprise corresponding apertures formed in the membrane of the second chamber.

9. Apparatus according to claim 3 comprising a stack of disks in which are formed said compartments and the input and output passage therefor, said membranes being gripped between the disks.

10. Apparatus according to claim 1 in which the pneumatic resistances are provided by apertures formed in the membranes.

11. Apparatus according to claim 1 in which the nozzle-baffle device includes a pressure input located remote from the nozzle and connected by a pneumatic resistance to a pressure source providing a pressure $P_a$.

12. Apparatus according to claim 11 including a copying chamber divided by a third membrane into a fifth compartment and a sixth compartment, the fifth compartment having a pressure input directly connected to the pressure source $P_2$, the pressure input of the sixth compartment being connected by a pneumatic resistance to the pressure source $P_a$, the sixth compartment also having an exhaust opening connected to the atmosphere and an output channel providing the pressure $P_2$ which is connected to the pressure input of the second compartment.

* * * * *

UNITED STATES PATENT AND TRADEMARK OFFICE
CERTIFICATE OF CORRECTION

PATENT NO. : 3,929,148
DATED : December 30, 1975
INVENTOR(S) : Michel Midy

It is certified that error appears in the above-identified patent and that said Letters Patent are hereby corrected as shown below:

In the Abstract, Line 23     "nozzle-palette" should read --nozzle-baffle--

Col. 7, Line 3     "passage" should read --passages--

*Signed and Sealed this*

*twenty-seventh* Day of *April 1976*

[SEAL]

Attest:

RUTH C. MASON
*Attesting Officer*

C. MARSHALL DANN
*Commissioner of Patents and Trademarks*